US012771608B2

(12) United States Patent
Kwok et al.

(10) Patent No.: US 12,771,608 B2
(45) Date of Patent: Oct. 20, 2026

(54) NETWORK SLICING BASED ON SERVICE TYPE

(71) Applicant: T-Mobile USA, Inc., Bellevue, WA (US)

(72) Inventors: Ming Shan Kwok, Seattle, WA (US); Wafik Abdel Shahid, Kenmore, WA (US); Tommy Yau, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 515 days.

(21) Appl. No.: 18/206,002

(22) Filed: Jun. 5, 2023

(65) Prior Publication Data

US 2024/0406069 A1 Dec. 5, 2024

(51) Int. Cl.

| | |
|---|---|
| ***H04L 41/0895*** | (2022.01) |
| ***H04L 41/0803*** | (2022.01) |
| ***H04L 41/40*** | (2022.01) |
| ***H04W 84/04*** | (2009.01) |

(52) U.S. Cl.

CPC ...... *H04L 41/0895* (2022.05); *H04L 41/0803* (2013.01); *H04L 41/40* (2022.05); *H04W 84/042* (2013.01)

(58) Field of Classification Search

CPC . H04L 41/0895; H04L 41/40; H04L 41/0803; H04W 84/042

USPC .......................................................... 370/328

See application file for complete search history.

(56) References Cited

U.S. PATENT DOCUMENTS

| | | | | |
|---|---|---|---|---|
| 2014/0143330 | A1* | 5/2014 | Shaw | G06Q 10/40 709/204 |
| 2018/0276689 | A1* | 9/2018 | Zhang | G06Q 30/0201 |
| 2021/0153110 | A1* | 5/2021 | Garcia Martin | H04W 48/18 |
| 2021/0274512 | A1* | 9/2021 | Bisaria | H04L 47/76 |
| 2022/0141762 | A1* | 5/2022 | Kalra | H04W 24/10 370/329 |
| 2023/0125804 | A1 | 4/2023 | Lee et al. | |
| 2023/0354172 | A1* | 11/2023 | Yang | H04W 36/0022 |
| 2023/0388888 | A1* | 11/2023 | Zhu | H04W 36/32 |
| 2024/0049103 | A1* | 2/2024 | Sabate | H04W 40/02 |
| 2024/0388979 | A1* | 11/2024 | Li | H04W 36/0072 |

OTHER PUBLICATIONS

Search Report for European Application No. 24179739.8, Dated Oct. 14, 2024, 10 pages.

* cited by examiner

*Primary Examiner* — Christopher B Robinson
*Assistant Examiner* — Chong G Kim
(74) *Attorney, Agent, or Firm* — Lee & Hayes, P.C.

(57) ABSTRACT

Techniques for determining a network slice for a communication session associated with user equipment (UE) are described herein. A fifth generation telecommunications network can implement a server to determine one or more network slices that enable the UE to receive a variety of services and/or applications as part of the communication session. The server can determine a location of the UE and application activity by the UE over a previous time period. The server can generate a set of network slices for the UE based on the location of the UE and the previous application activity. The server can transmit the set of network slices to the UE to cause the UE to access a network slice of the set of network slices during the communication session.

20 Claims, 5 Drawing Sheets

NETWORK SLICING BASED ON SERVICE TYPE

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies: Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
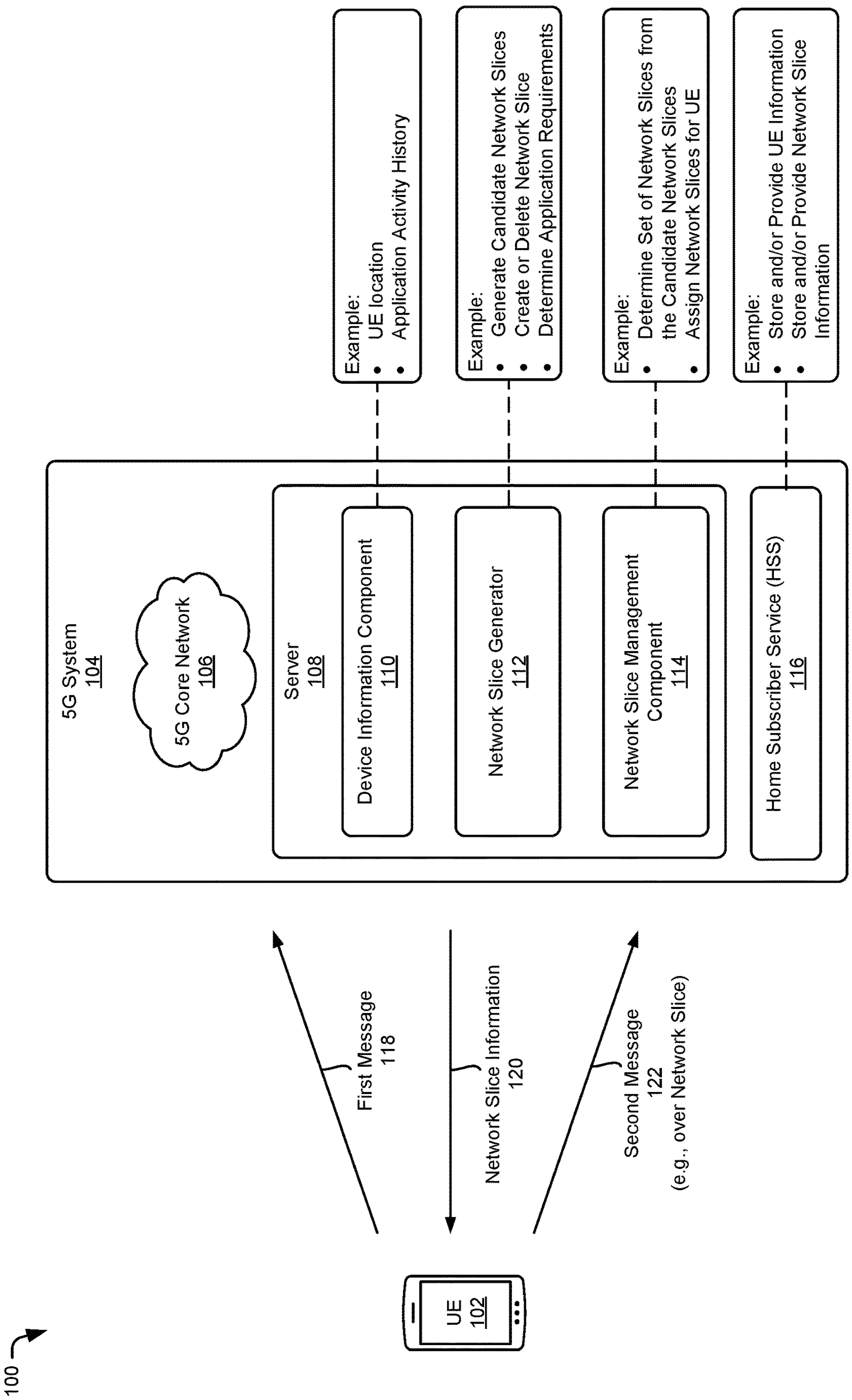
FIG. 1 depicts an example network environment in which an example user equipment (UE) can connect to a telecommunications system that includes an example server to implement the techniques described herein.

This application relates to techniques for determining a network slice for a communication session associated with user equipment (UE). The network slice techniques can include a 5G telecommunications system implementing a server that determines one or more network slices that enable the UE to receive a variety of services and/or applications as part of the communication session. For example, the server can determine a location of the UE and application activity by the UE over a previous time period. The server can transmit a set of network slices to the UE based on the location of the UE, and the previous application activity. By implementing the server to perform the functionality described herein, network slice(s) can be provided to UEs prior to receiving a request from the UE to use a particular application. In this way, the techniques can improve network capacity, security, and/or quality of service for various services and/or applications the UE may request in the future.

Generally, the server can represent functionality to identify, generate, or otherwise determine network slices for different UEs. For instance, the server of the 5G telecommunication network can generate different classifications, or categories, of network slices that serve the requirements (e.g., bandwidth, security, latency, etc.) of a particular application. The server may, for instance, represent firmware, hardware and/or software that determines a number of candidate network slices that are available for use by a UE, and further determines which of the candidate network slices to provide the UE for a current UE location.

In some examples, the server can receive a set of applications, services, or other data as input and classify each application or service in one of multiple predetermined categories. The server can, for example, generate a number of predetermined categories such as finance, gaming, sports, music, video, and the like. In various examples, the server can determine subcategories having additional levels of detail within a predetermined category. For example, the server may classify an application as having a predetermined category of "gaming", with a subcategory of "real-time" or "live", and identify a network slice that corresponds to the classification.

The server can, for example, transmit data indicating the network slices to various UEs to cause the UEs to exchange data in association with the application or service. In various examples, the server can proactively communicate network slice information to the UEs before receiving a request to use the application or service from the UE. For example, a base station associated with the 5G telecommunication system can send a request for network slice information to the server responsive to detecting presence of the UE, and receive network slice information for transmitting to the UE. In some examples, the server can provide the base station network slice information for sending to the UE independent of the UE explicitly requesting a network slice or imitating an application.

In some examples, the server can represent an Access and Mobility Management Function (AMF) configured to identify a device identifier (e.g., a PANI, an IMEI, etc.) associated with a message from a UE (e.g., a call setup request, etc.) for determining a location of the UE, historical application activity, or other device information. For example, the AMF can determine use the device identifier to access historical data indicating application used by the UE at a previous time. In various examples, the AMF can select network slices available to the UE, and transmit the selected network slices to the UE for exchanging data associated with one or more applications.

By providing network slice techniques as described herein, an example computing device (e.g., the server) can improve quality of service, latency, and other performance metrics for providing service to UEs authorized to receive various services via a telecommunications network. In various example, the server enables the UEs, base stations, or other network entities to transmit fewer messages using less data. By exchanging fewer messages to establish a communication session, additional bandwidth is available on the 5G network. Further, using the techniques described herein can improve transmission of application data for a UE using a telecommunications network by reducing latency through use of network slices specific for each UE. Further description of network slicing techniques by the server can be found throughout this disclosure including in the figures below.

FIG. 1 depicts an example network environment 100 in which an example user equipment (UE) can connect to a telecommunications system that includes an example server to implement the techniques described herein. For example, a UE 102 can connect to a 5G system 104 to exchange data associated with a communication session or otherwise receive a service. For instance, the UE may exchange data associated with an application, a voice call, a video call, and the like.

The UE 102 may represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, a Machine to Machine device (M2M), a vehicle, an unmanned aerial vehicle (UAV), an Internet of Things (IoT) device, or any other type of computing or communication device. An example architecture for the UE 102 is illustrated in greater detail in FIG. 5.

As depicted in FIG. 1, the 5G system 104 comprises a 5G core network 106 and a server 108 to determine one or more network slices usable for a communication session between the UE 102 and another UE or computing device. Generally, the server 108 can represent an Access and Mobility Management Function (AMF), an IP Multimedia Subsystem (IMS), or other component associated with the 5G system 104. FIG. 1 further depicts the server 108 comprising a device information component 110, a network slice generator 112, and a network slice management component 114 as well as a Home Subscriber Server (HSS) 116. For example, the various components of the server 108 may exchange data with the HSS 116 to implement the network slicing techniques described herein.

The device information component 110 can, for example, represent functionality to determine information about UEs such as a current location of the UE 102, a history of applications or services executed by the UE 102 over previous time period, etc. In some examples, the device information component 110 can determine a location of the UE 102 based at least in part on information from a network entity associated with the 5G core network 106 (e.g., a base station, etc.). The location the UE 102 may also or instead be determined based at least in part on message data associated with a first message 118 from the UE 102. For example, the UE 102 can send the first message 118 to the 5G core network 106, and the server 108 can detect a device identifier, location information, device capabilities, and so on based on information in the first message 118. In some examples, the first message 118 represents a request for a communication session which may or may not include a request to execute an application as part of the service received from the 5G system 104.

The device information component 110 can, for example, identify one or more applications executed by the UE 102 during a previous time period. For instance, the device information component 110 can receive historical data (e.g., application data or other device information) associated with the UE 102 from the HSS 116, the UE 102, or other source. In various examples, the device information component 110 can identify which types of applications are likely to be used (e.g. executed by the UE 102) at a future time. The device information component 110 can, in some examples, provide output data representing the UE location and/or the applications previously used by the UE to another component of the server 108 for processing (e.g., for use in determining a set of network slices for sending to the UE 102).

The device information component 110 can, for example, intercept the first message 118 (e.g., a call setup message) and extract or otherwise determine device information associated with the UE 102. For example, the device information component 110 can identify a P-Access-Network-Information (PANI), an International Mobile Equipment Identity (IMEI), or other device identifier, associated with the UE 102 usable to identify the UE 102. In various examples, the device information component 110 can compare the device information (e.g., the PANI, the IMEI, etc.) to a table, a list, or other data stored in memory that identifies an identity of the UE, a user of the UE, a chipset, a radio frequency, or other capability of the UE 102. Accordingly, the device information component 110 can send output data to another component for use in determining network slices that are compatible with a device regardless of a model or manufacturer of the device.

The network slice generator 112 can include functionality to generate or determine network slices usable by a UE (e.g., the UE 102) for exchanging data with the 5G core network 106. For example, the network slice generator 112 can generate network slices for different UEs based on device information for each UE. A network slice can represent an independent communication channel from the UE to one of: another UE, a server providing an application to the UE, and the like. In various examples, the network slice generator 112 can configure candidate network slices that meet the latency and security requirements of a particular application or family of applications. In various examples, the candidate network slices can be stored in a storage device for access by the network slice management component 114 (or another component) for associating with the UE 102. Each candidate network slice can be associated with an identifier, security information, and a list of applications that the candidate network slice supports (e.g., applications provided within a quality of service threshold).

In various examples, the network slice generator 112 can determine classifications for multiple applications based at least in part on a bandwidth, latency, or other requirement associated with executing each application by a processor of the UE. In such examples, the network slice generator 112 can configure candidate network slices based at least in part on the classifications of the multiple applications. For example, the network slice generator 112 can receive input data representing applications or services provided via the 5G core network 106, and output a classification for each application or service in a predetermined category. Some predetermined categories can include finance, gaming, sports, music, video, shopping, blogging, social media, photos, among others.

In various examples, the server 108 can determine subcategories of each predetermined category to understand the requirements of each application at a more granular level. For example, the network slice generator 112 may classify an application based on a set of criteria including but not limited to: latency requirements (e.g., a subcategory of "real-time" "non-real-time", "live", etc. may be used), security requirements (e.g., a finance application may require different security than a social media application), etc., By defining additional sub-categories, the network slice generator 112 can generate network slices that meet the requirements of different applications. In some examples, the network slice can be generated for a corresponding classification (e.g., category, subcategory). In such examples, the network slice generator 112 can generate network slice information 120 for sending to the UE 102 which includes network slices for different applications to ensure that each specific application operates using a network slice that optimizes the application performance (e.g., performs at or above a performance threshold).

In some examples, the network slice generator 112 can generate a network slice to correspond to or otherwise provide a service (e.g., an RCS slice, a VoNR slice, a ViNR slice, a text slice, etc.). For instance, network slices can be generated for use with a particular service provided by the 5G system 104 to meet the security, bandwidth, latency, and/or other requirements of the particular service. In various examples, a service can be associated with multiple subcategories, and additional network slices can be assigned to one or more of the application subcategories.

Generally, the network slice management component 114 provides functionality to determine whether to create a new network slice, delete a network slice, determine a set of network slices from the candidate network slices, or otherwise manage a network slice. For example, the network slice management component 114 can identify applications supported by the candidate network slices as a whole, and determine whether a different number of network slices, or a new network slice, is needed to support an application. For instance, the candidate network slices can be updated and change as application requirements change, thus updating a network slice, adding a new network slice, and/or removing a network slice can occur over time to provide a network slice for applications available from a third-party, such as from an application store.

In some examples, the network slice management component 114 can select, assign, or determine which candidate network slices are best suited for a particular UE (e.g., optimizes performance). For example, a set of network slices can be determined from the candidate network slices based on matching specific application information associated with each UE to a list of applications supported by each network slice. The network slice management component 114, can, for example, receive device information from the device information component 110 identifying a current location of a UE, previous locations of a UE, previously used applications, and the like. In some examples, the device information associated with the UE can identify an application type and/or application requirements (e.g., latency, throughput, security, etc.) executed by the UE during a previous time period.

In some examples, the network slice management component 114 can identify one or more applications accessed by the UE during the previous time period, and compare a first type of the first application and a second type of the second application to the list of applications associated with each candidate network slice. For instance, the network slice management component 114 can compare the types of applications used by the UE with the list of applications generated by the network slice generator 112 after the candidate network slice is generated. Based at least in part on the comparing, the network slice management component 114 can select one or more of the candidate network slices as the set of network slices.

In various examples, the network slice management component 114 can transmit the set of network slices to the UE 102 over the 5G core network 106 (e.g., the network slice information 120) to cause the UE 102 to access a network slice of the set of network slices to provide a communication session. For example, depending upon a location of the UE and/or the device information associated with the UE, the network slice management component 114 can generate an instruction for sending to the UE that includes data representing the set of network slices. For example, the server 108 can send network slice information 120 to the UE 102 that comprises the set of network slices determined by the network slice management component 114 which are then available to the UE 102 prior to an associated application being executed by a process of the UE 102.

As the UE 102 moves in an environment, the network slice management component 114 can send the UE 102 an updated set of network slices corresponding to a current position of the UE 102 and/or changes in application activity (e.g., to notify the UE of a network slice for a new application). The network slice management component 114 can, for example, transmit a set of network slices to one or more UEs in an environment periodically, at a time interval, and/or responsive to the UE receiving service from a new base station, just to name a few. The network slice management component 114 can transmit the set of network slices to the UE prior to the UE sending a message to the 5G core network 106 requesting to execute an application associated with a network slice. Thus, the UE 102 can use various applications (e.g., a real-time gaming application, a video application to display a video, a video application to display a live event, etc.) without being aware that the 5G core network 106 is configured to provide the set of slices.

In some examples, the network slice management component 114 can determine information about a base station (e.g., a gNB) or other network element used to exchange data with the UE 102 and/or the server 108. For instance, the network slice management component 114 can identify a cell global identity (CGI) associated with the first message 118 and determine radio frequencies available to the base station based at least in part on the CGI. In some examples, the network slice information 120 can further indicate which radio frequencies for the UE 102 to access in association with a network slice.

In some examples, the server 108 can represent an AMF that is further configured to provide a control plane and/or a user plane to UEs that are authorized to receive services from the 5G system 104. For example, the server 108 can include an AMF that maintains service to a respective UE as the UE changes locations across different gNBs over time.

In various examples, the server 108 (or a component or generator thereof) can implement a machine learned model that learns from a training data set to improve accuracy of an output (e.g., a prediction). For example, the network slice generator 112 can determine the categories and/or the subcategories based at least in part on an output from a machine learned model. In some examples, the categories and/or the subcategories can change dynamically over time. In various examples, the server 108 may utilize machine learned techniques to predict categories and/or capabilities for different network slices. In such examples, machine learned algorithms may be trained to determine the categories and/or subcategories, a number of network slices, a number of properties to associate with each network slice category, etc. based on training data (e.g., previous outputs by the server 108, a labelled classification, "ground truth", etc.). In some examples, the network slice generator 112, or other component of the server 108, may be implemented as a neural network. Thus, the server 108 can employ machines learned techniques to modify (e.g., change a category property, add a new category, etc.) how network slices are categorized and/or used.

Generally, the HSS 116 can provide functionality including storing network information (including network slice information), device information, user information, etc. In some examples, the HSS 116 can determine network information about a base station used by the UE 102 when sending the first message 118. Additionally, or alternatively, the HSS 116 can store previous application activity data for applications executed by a process of the UE 102. In various examples, output data from a component of the server 108 can be stored in the HSS 116 for access at a later time. For example, the HSS 116 can receive candidate network slices from the network slice generator 112 and/or a set of network slices from the network slice management component 114 for storage.

In some examples, the HSS 116 can exchange data with the device information component 110 to provide information specific for the UE 102 usable for determining a current location, historical data consumption, and the like. In various examples, the server 108 can provide the network slice information 120 to the UE 102 based on data received from the HSS 116, the base station, a third-party, the device information component 110, the network slice generator 112, and/or the network slice management component 114.

In various examples, the 5G core network 106 can receive a second message 122 using a network slice provided by the network slice management component 114 as part of the network slice information 120. The second message 122 can represent a request from the UE 102 to exchange data with an application associated with the network slice information 120. In various examples, the network slice information 120 can be received by the UE 102 to enable the second message 122 to use one or more network slices independent of a request for the network slices from the UE 102.

To implement the techniques described herein, in various examples the 5G system 104 and/or the server 108 can include one or more of: an a proxy call session control function (PCSCF), an interrogating call session control function (ICSCF), a serving call session control function (SCSCF), a serving gateway (SGW), a packet data network gateway (PGW), a policy and charging rules function (PCRF), and an internet protocol short message gateway (IPSM-GW), a short message service center (SMSC), and an evolved packet data gateway (ePDG), and a Home Subscriber Server (HSS), just to name a few. In addition, the techniques described herein may be implemented using Real-Time Protocol (RTP) and/or Real-Time Control Protocol (RTCP), among others.

In various examples, the 5G system 104 can represent functionality to provide a communication channel for the UE 102, and can include one or more radio access networks (RANs), as well as one or more core networks linked to the RANs. For instance, a UE 102 can wirelessly connect to a base station or other access point of a RAN, and in turn be connected to the 5G core network 106. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, third generation (3G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi technology, and/or any other previous or future generation of radio access technology. In this way, the 5G system 104 is compatible to operate with other radio technologies including those of other service providers. Accordingly, the first message 118 from the UE 102 may originate with another service provider (e.g., a third-party) and be processed by the IMS independent of the technolog (ies) or core network associated with the service provider.

While shown separately in FIG. 1, the device information component 110, the network slice generator 112, and the network slice management component 114 (and the functionality thereof) can be included in a single component of the server 108 or another computing device.

In some examples, the 5G core network 106 can represent a service-based architecture that includes multiple types of network functions that process control plane data and/or user plane data to implement services for the UE 102. In some examples, the services comprise rich communication services (RCS), a VoNR service, a ViNR service, and the like which may include a text, a data file transfer, an image, a video, or a combination thereof. The network functions of the 5G core network 106 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Figure 2:
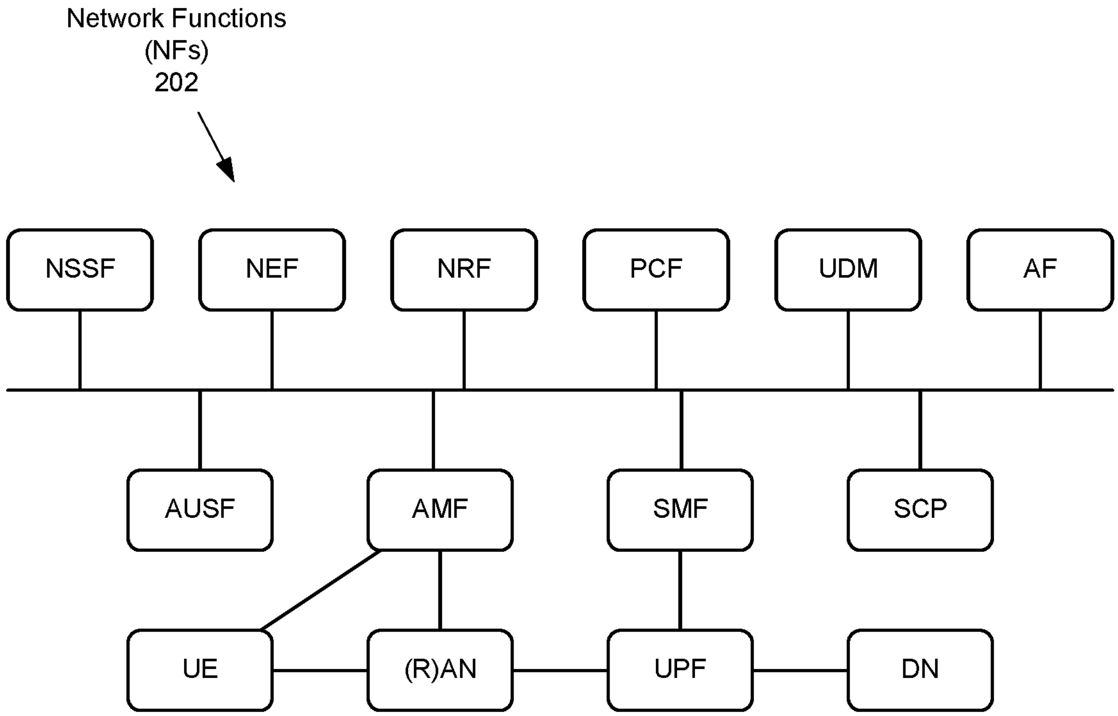
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 106 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 106), including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G core network 106 can be implemented as network applications that execute within containers (not shown). The NFs 202 can execute as hardware elements, software elements, and/or combinations of the two within telecommunication network(s), and accordingly many types of the NFs 202 can be implemented as software and/or as virtualized functions that execute on cloud servers or other computing devices. Network applications that can execute within containers can also include any other type of network function, application, entity, module, element, or node.

The 5G core network 106 can, in some examples, determine a connection between an IMS that manages a communication session for the UE 102, including sessions for short messaging, voice calls, video calls, and/or other types of communications. For example, the UE 102 and the IMS of the 5G system 104 can exchange Session Initiation Protocol (SIP) messages to set up and manage individual communication sessions. In some examples, the IMS of the 5G system 104 can generate a communication channel for a voice communication, video communication, or other communication between the UE 102 and another computing device (e.g., another UE).

Figure 3:
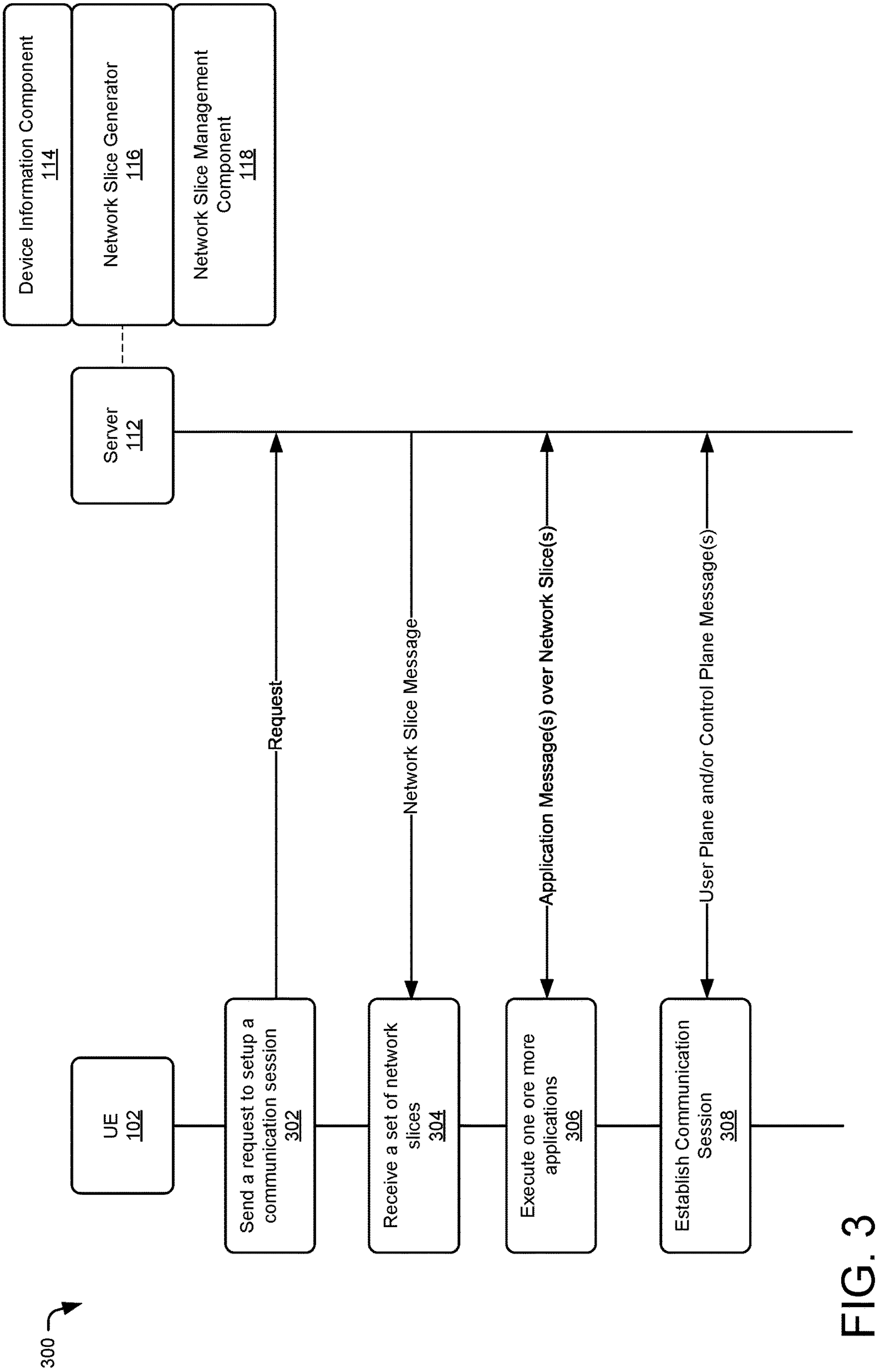
FIG. 3 depicts a messaging flow for setting up a communication session through an example server in an example telecommunication system.

FIG. 3 depicts a messaging flow for setting up a communication session through an example server in an example telecommunication system. For example, the UE 102 may exchange (e.g., send and/or receive) one or more messages with the server 108 of FIG. 1 (e.g., the device information component 110, the network slice generator 112, and/or the network slice management component 114) to establish a communication session with another UE. In some examples, the device information component 110, the network slice generator 112, and/or the network slice management component 114 can be included in an AMF or other component, computing device, or entity of the 5G system 104 that is configured to determine a communication session for the UE 102.

At 302, the UE 102 can send a request to setup a communication session over the 5G core network 106 to the server 108 of the 5G system 104. For example, the UE 102 can send a call setup message, a test message, or other message usable to connect the UE 102 to another server or UE. The call setup instruction can include, for example, message requesting a communication channel from an IMS, an AMF, or other entity of the 5G system 104.

At 304 the UE 102 can receive a network slice message (e.g., the network slice information 120) from the network slice management component 114 indicating a set of network slices for use with executing one or more applications. Responsive to receiving the network slice message at 304, the UE 102 can, at 306, execute one or more applications by a processor including exchanging one or more application messages over a corresponding network slice(s). For example, based at least in part on receiving the network slice message at 304, the UE 102 can initiate execution of one or more applications over the respective network slice. Accordingly, the UE 102 can receive a variety of services using the set of network slices. In various examples, the set of network slices can be based on a location of the UE 102 relative to a network element (e.g., a base station, an antennae, a transceiver, a serving node, a computing device, etc.) of the 5G core network 106. The network slice message may also or instead include a set of network slices that are selected by the network slice management component 114 from candidate network slices output by the network slice generator 112.

At 308 the UE 102 and the server 108 can establish the communication session by exchanging a user plane message (s) and/or a control plane message(s) with the server 108 (or another component of the 5G core network 106). For instance, the 5G core network 106 can process control plane data and/or user plane data to implement services for the UE 102. In some examples, the server 108 can represent an AMF that is configured to provide a control plane and/or a user plane to the UE 102 after verifying that the UE 102 (or user thereof) is authorized to receive services from the 5G system 104.

Though the device information component 110, the network slice generator 112, and the network slice management component 114 are illustrated in FIG. 3 individually, it is understood that the device information component 110, the network slice generator 112, and the network slice management component 114 (or functionality provided therefrom) may be directly coupled to and/or integrated into an AMF, IMS, or other entity of the 5G system 104. Further, though described in relation to the 5G system 104, the network slicing techniques can be used in other telecommunications systems other than those using a 5G architecture.

Figure 4:
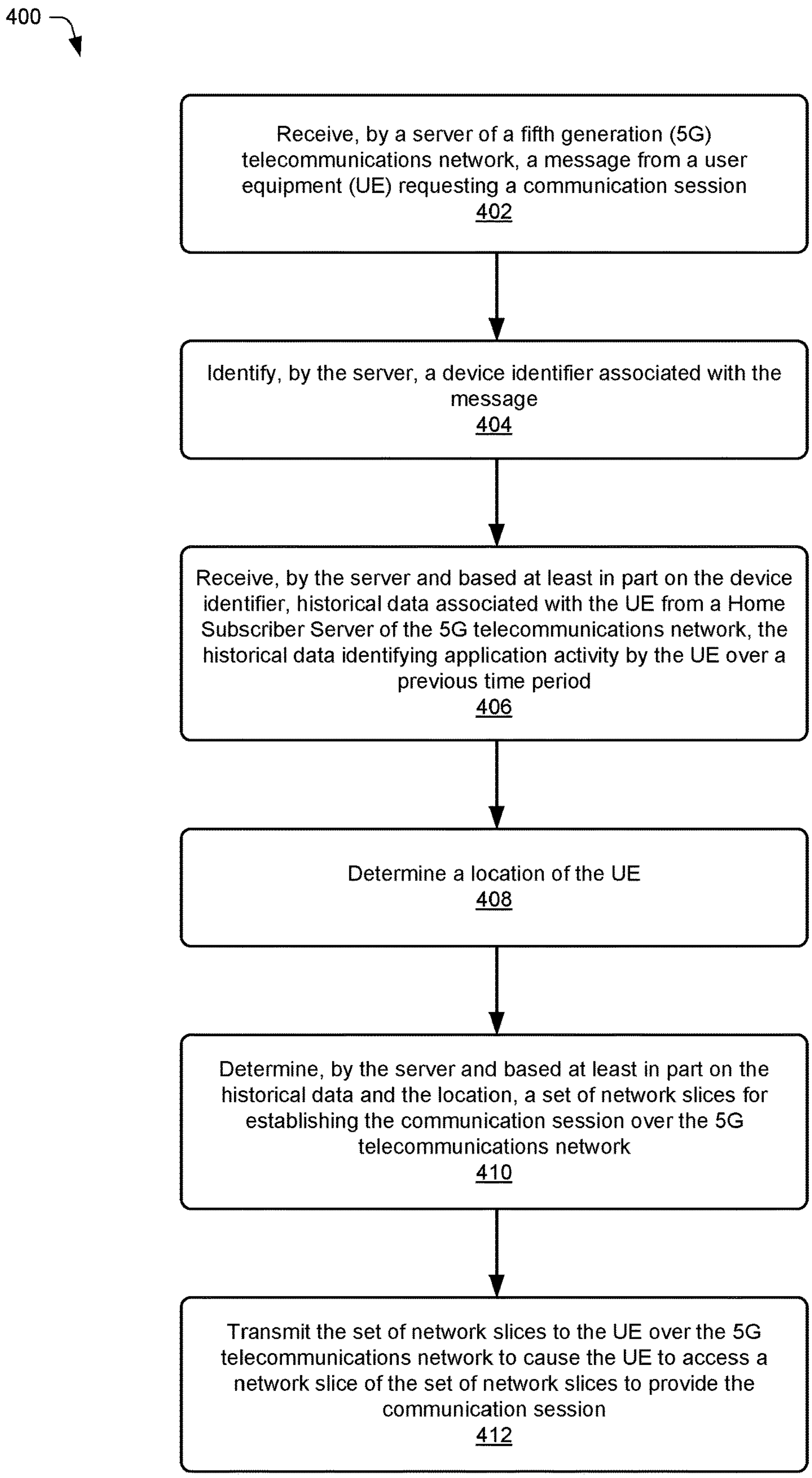
FIG. 4 depicts a flowchart of an example process for determining a set of network slices for transmitting to an example user equipment.

FIG. 4 depicts a flowchart of an example process 400 for determining a set of network slices for transmitting to an example user equipment. Some or all of the process 400 may be performed by one or more components in FIGS. 1-3, as described herein. For example, some or all of process 400 may be performed by the server 108 of FIG. 1.

At operation 402, the process may include receiving, by a server of a fifth generation (5G) telecommunications network, a message from a user equipment (UE) requesting a communication session. In some examples, the operation 402 may include the server 108 receiving message data indicating that the UE initiated a voice call (e.g., a VoNR communication) to another UE and requests that a communication session be established to facilitate the voice call. The server 108 may also or instead receive a message (e.g., the first message 118) requesting to establish a voice call, video call, text, etc. The communication session can, for instance, enable the UE 102 to receive a service or execute an application over the 5G telecommunications network (e.g., the 5G core network 106).

At operation 404, the process may include identifying, by the server, a device identifier associated with the message. For instance, the server 108 can extract, identify, or otherwise determine a PANI, an IMEI, or other device identifier, associated with the message received from the UE.

At operation 406, the process may include receiving, by the server and based at least in part on the device identifier, historical data associated with the UE from a Home Subscriber Server of the 5G telecommunications network. In some examples, the operation 406 may include the server 108 sending a request for information to the HSS 116 for historical application data or other user information, device information, and the like identifying application activity by the UE over a previous time period. The data provided by the HSS 116 can be used during operations to determine a set of network slices specific for the UE. In some examples, the operation 406 may include the server 108 determining, based at least in part on the device identifier, a radio frequency band or a radio technology usable by the UE to establish the communication session at a future time.

At operation 408, the process may include determining a location of the UE. In some examples, the operation 408 may include the server 108 determining a geographical location of the UE relative to a coordinate system and/or relative to a network element of the 5G telecommunications system. The location of the UE may be based at least in part on device information received from a base station associated with the UE at a current time, a base station used by the UE at a previous time, device information from the HSS 116, just to name a few. The UE location may also or instead be determined by a location service or other component of the 5G system 104.

At operation 410, the process may include determining, by the server and based at least in part on the historical data and the location, a set of network slices for establishing the communication session over the 5G telecommunications network. In some examples, the operation 410 may include the network slice generator 112 and/or the network slice management component 114 receiving a set of candidate network slices from a storage device, comparing characteristics of the candidate network slices with applications used by the UE at the previous time period, and selecting the set of network slices from the available candidate network slices.

At operation 412, the process may include transmitting the set of network slices to the UE over the 5G telecommunications network to cause the UE to access a network slice of the set of network slices to provide the communication session. For example, the network slice management component 114 can send network slice information 120 comprising the set of network slices to the UE 102. Based at least in part on transmitting the set of network slices, the UE can access a network slice of the set of network slices to exchange application data associated with an application.

Figure 5:
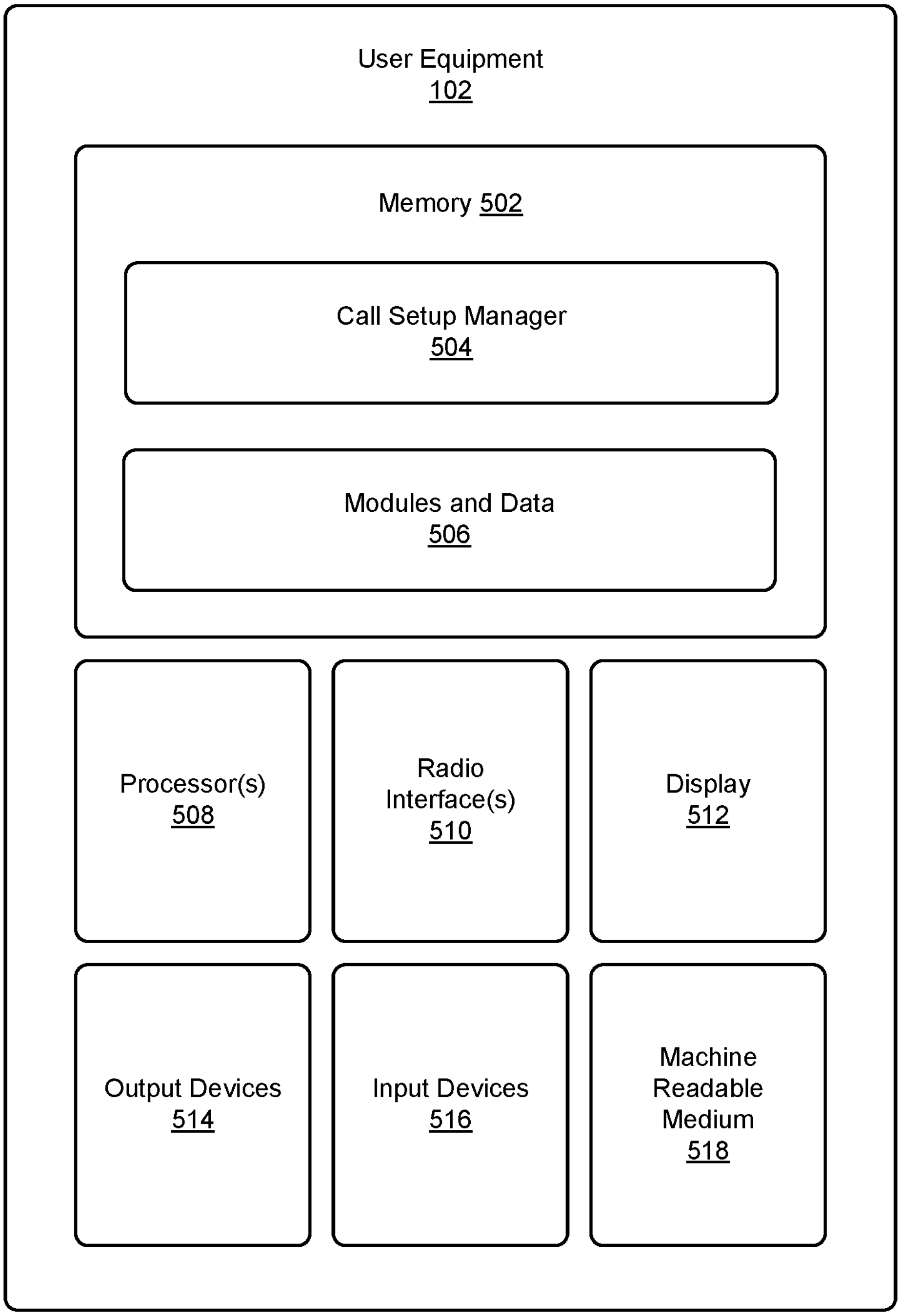
FIG. 5 depicts an example system architecture for a user equipment.

FIG. 5 depicts an example system architecture for a UE 102, in accordance with various examples. As shown, a UE 102 can have memory 502 storing a call setup manager 504, and other modules and data 506. A UE 102 can also comprise processor(s) 508, radio interfaces 510, a display 512, output devices 514, input devices 516, and/or a machine readable medium 518.

In various examples, the memory 502 can include system memory, which may be volatile (such as RAM), non-volatile (such as ROM, flash memory, etc.) or some combination of the two. The memory 502 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 504 can send and/or receive messages comprising a VoNR service, a ViNR service, and/or an RCS service including SIP messages associated with setup and management of a call session via an IMS, an AMF, or the like. The SIP messages can include an SIP INVITE message and/or other SIP messages.

The other modules and data 506 can be utilized by the UE 102 to perform or enable performing any action taken by the UE 102. The modules and data 506 can include a UE platform, operating system, and applications, and data utilized by the platform, operating system, and applications.

In various examples, the processor(s) 508 can be a central processing unit (CPU), a graphics processing unit (GPU), or both CPU and GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing all computer applications stored in the memory 502, which can be associated with common types of volatile (RAM) and/or nonvolatile (ROM) memory.

The radio interfaces 510 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 510 can be compatible with multiple radio access technologies, such as 5G radio access technologies and 4G/LTE radio access technologies. Accordingly, the radio interfaces 510 can allow the UE 102 to connect to the 5G system 104 and/or a 4G system as described herein.

The display 512 can be a liquid crystal display or any other type of display commonly used in UEs. For example, display 512 may be a touch-sensitive display screen, and can then also act as an input device or keypad, such as for providing a soft-key keyboard, navigation buttons, or any other type of input. The output devices 514 can include any sort of output devices known in the art, such as the display 512, speakers, a vibrating mechanism, and/or a tactile feedback mechanism. Output devices 514 can also include ports for one or more peripheral devices, such as headphones, peripheral speakers, and/or a peripheral display. The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 518 can store one or more sets of instructions, such as software or firmware, that embodies any one or more of the methodologies or functions described herein. The instructions can also reside, completely or at least partially, within the memory 502, processor(s) 508, and/or radio interface(s) 510 during execution thereof by the UE 102. The memory 502 and the processor (s) 508 also can constitute machine readable media 518.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

receiving, by a server of a fifth generation (5G) telecommunications network, a message from a user equipment (UE) requesting a communication session;

identifying, by the server, a device identifier associated with the message;

receiving, by the server and based at least in part on the device identifier, historical data associated with the UE from a Home Subscriber Server of the 5G telecommunications network;

identifying, by the server and based at least in part on the historical data, one or more applications associated with the historical data;

classifying, by the server, the one or more applications into one or more application categories or application sub-categories;

determining a location of the UE;

determining, by the server and based at least in part on the application categories or application sub-categories and the location, a set of network slices for establishing the communication session over the 5G telecommunications network; and transmitting the set of network slices to the UE over the 5G telecommunications network to cause the UE to access a network slice of the set of network slices to provide the communication session.

2. The method of claim 1, wherein determining the set of network slices comprises:

determining data representing candidate network slices for the location of the UE, the data indicating a list of applications provided by each candidate network slice of the candidate network slices;

identifying a first application and a second application accessed by the UE during the previous time period;

comparing a first type of the first application and a second type of the second application to the list of application associated with each candidate network slice; and selecting one or more of the candidate network slices as the set of network slices based at least in part on the comparing.

3. The method of claim 1, further comprising:

determining classifications for multiple applications based at least in part on a bandwidth or latency requirement associated with executing each application by a processor of the UE;

configuring candidate network slices based at least in part on the classifications of the multiple applications; and determining to include one or more of the candidate network slices in the set of network slices based at least in part on the location of the UE.

4. The method of claim 1, wherein the set of network slices is a first set of network slices, the location is a first location, determining the first location of the UE is associated with a first time, and further comprising:

storing network data in a storage device identifying the set of network slices, an application associated with each network slice in the set of network slices, and a base station associated with the UE;

determining a second location of the UE at a second time after the first time; and determining, by the server and based at least in part on the network data and the second location, a second set of network slices for establishing the communication session or for establishing a future communication session.

5. The method of claim 4, wherein:

the second location of the UE is associated with a different base station than the base station identified in the network data, and the second set of network slices comprises a different number of network slices as the first set of network slices.

6. The method of claim 1, wherein:

a network slice in the set of network slices comprises security information, bandwidth information, and latency information for one or more applications available for execution by a processor of the UE.

7. The method of claim 1, wherein:

the device identifier comprises in a P-Access-Network-Information (PANI) or an International Mobile Equipment Identity (IMEI) associated with the UE, and the server comprises an Access and Mobility Management Function (AMF).

8. The method of claim 1, wherein causing the UE to access the network slice of the set of network slices comprises:

configuring the network slice between the UE and a base station of the telecommunications network; and causing data to exchange between an application executing on the UE and the telecommunications network over the network slice.

9. The method of claim 1, wherein:

the set of network slices includes a first network slice for a first application and a second network slice for a second application, and the message is associated with one of: the first application or the second application.

10. A system comprising:

one or more processors; and memory storing computer-executable instructions that, when executed by the one or more processors, cause the system to perform operations comprising:

receiving, by a server of a telecommunications network, a message from a user equipment (UE) requesting a communication session;

identifying, by the server, a device identifier associated with the message;

receiving, by the server and based at least in part on the device identifier, historical data associated with the UE from a Home Subscriber Server of the telecommunications network;

identifying, by the server and based at least in part on the historical data, one or more applications associated with the historical data;

classifying, by the server, the one or more applications into one or more application categories or application sub-categories;

determining a location of the UE;

determining, by the server and based at least in part on the historical data and the location, a set of network slices for establishing the communication session over the telecommunications network; and transmitting the set of network slices to the UE over the telecommunications network to cause the UE to access a network slice of the set of network slices to provide the communication session.

11. The system of claim 10, wherein:

the telecommunications network comprises a fifth generation telecommunications network, the historical data identifying application activity by the UE over a previous time period, and transmitting the set of network slices to the UE is performed before the UE initiates a request to open an application associated with one of the network slices.

12. The system of claim 10, wherein the message is a first message associated with a call setup instruction, and the operations further comprise:

receiving a second message indicating a request to execute an application as a service over the telecommunications network; and causing the UE to access the network slice of the set of network slices responsive to receiving the second message.

13. The system of claim 10, the operations further comprising:

determining data representing candidate network slices for the location of the UE, the data indicating a list of applications provided by each candidate network slice of the candidate network slices;

identifying a first application and a second application accessed by the UE during a previous time period;

comparing a first type of the first application and a second type of the second application to the list of application associated with each candidate network slice; and selecting one or more of the candidate network slices as the set of network slices based at least in part on the comparing.

14. The system of claim 10, the operations further comprising:

determining classifications for multiple applications based at least in part on a bandwidth or latency requirement associated with executing each application by a processor of the UE;

configuring candidate network slices based at least in part on the classifications of the multiple applications; and determining to include one or more of the candidate network slices in the set of network slices based at least in part on the location of the UE.

15. The system of claim 10, wherein the set of network slices is a first set of network slices, the location is a first location, determining the first location of the UE is associated with a first time, and further comprising:

storing network data in a storage device identifying the set of network slices, an application associated with each network slice in the set of network slices, and a base station associated with the UE;

determining a second location of the UE at a second time after the first time; and determining, by the server and based at least in part on the network data and the second location, a second set of network slices for establishing the communication session or for establishing a future communication session.

16. One or more non-transitory computer-readable media storing instructions executable by one or more processors, wherein the instructions, when executed, cause the one or more processors to perform operations comprising:

receiving, by a server of a telecommunications network, a message from a user equipment (UE) requesting a communication session;

identifying, by the server, a device identifier associated with the message;

receiving, by the server and based at least in part on the device identifier, historical data associated with the UE from a Home Subscriber Server of the telecommunications network;

identifying, by the server and based at least in part on the historical data, one or more applications associated with the historical data;

classifying, by the server, the one or more applications into one or more application categories or application sub-categories;

determining a location of the UE;

determining, by the server and based at least in part on the historical data and the location, a set of network slices for establishing the communication session over the telecommunications network; and transmitting the set of network slices to the UE over the telecommunications network to cause the UE to access a network slice of the set of network slices to provide the communication session.

17. The one or more non-transitory computer-readable media of claim 16, wherein the message is a first message associated with a call setup instruction, and the operations further comprise:

receiving a second message indicating a request to execute an application as a service over the telecommunications network; and causing the UE to access the network slice of the set of network slices responsive to receiving the second message.

18. The one or more non-transitory computer-readable media of claim 16, the operations further comprising:

determining data representing candidate network slices for the location of the UE, the data indicating a list of applications provided by each candidate network slice of the candidate network slices;

identifying a first application and a second application accessed by the UE during a previous time period;

comparing a first type of the first application and a second type of the second application to the list of application associated with each candidate network slice; and selecting one or more of the candidate network slices as the set of network slices based at least in part on the comparing.

19. The one or more non-transitory computer-readable media of claim 16, the operations further comprising:

determining classifications for multiple applications based at least in part on a bandwidth or latency requirement associated with executing each application by a processor of the UE;

configuring candidate network slices based at least in part on the classifications of the multiple applications; and determining to include one or more of the candidate network slices in the set of network slices based at least in part on the location of the UE.

20. The one or more non-transitory computer-readable media of claim 16, wherein the set of network slices is a first set of network slices, the location is a first location, determining the first location of the UE is associated with a first time, and further comprising:

storing network data in a storage device identifying the set of network slices, an application associated with each network slice in the set of network slices, and a base station associated with the UE;

determining a second location of the UE at a second time after the first time; and determining, by the server and based at least in part on the network data and the second location, a second set of network slices for establishing the communication session or for establishing a future communication session.

* * * * *